(12) United States Patent
Barker et al.

(10) Patent No.: US 10,996,140 B2
(45) Date of Patent: May 4, 2021

(54) GAS TURBINE ENGINE PROBES AND METHODS OF DETECTING AN ENGINE CONDITION

(71) Applicant: Rolls-Royce Corporation, Indianapolis, IN (US)

(72) Inventors: Brett Barker, Indianapolis, IN (US); Eric Koenig, Fishers, IN (US); Tyler Gillen, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 154 days.

(21) Appl. No.: 16/297,305

(22) Filed: Mar. 8, 2019

(65) Prior Publication Data
US 2020/0284693 A1 Sep. 10, 2020

(51) Int. Cl.
| | | |
|---|---|---|
| *G01M 15/14* | (2006.01) | |
| *F01D 21/00* | (2006.01) | |
| *F01D 25/12* | (2006.01) | |
| *F02C 7/12* | (2006.01) | |
| *G05B 19/042* | (2006.01) | |

(52) U.S. Cl.
CPC .......... *G01M 15/14* (2013.01); *F01D 21/003* (2013.01); *F01D 25/12* (2013.01); *F02C 7/12* (2013.01); *G05B 19/042* (2013.01); *F05D 2260/201* (2013.01); *F05D 2260/80* (2013.01); *G05B 2219/25125* (2013.01)

(58) Field of Classification Search
CPC .......... F02C 7/12; F01D 25/12; G01M 15/14
USPC ...................................................... 73/112.01
See application file for complete search history.

(56) References Cited

U.S. PATENT DOCUMENTS

| | | | |
|---|---|---|---|
| 4,591,794 A | 5/1986 | Shattuck et al. | |
| 5,070,722 A | 12/1991 | Hawman et al. | |
| 6,402,471 B1* | 6/2002 | Demers | F01D 5/081 |
| | | | 416/97 R |
| 9,714,967 B1 | 7/2017 | Weickert et al. | |
| 2010/0275574 A1* | 11/2010 | Salunkhe | F04D 29/526 |
| | | | 60/39.091 |
| 2011/0048117 A1* | 3/2011 | Kell | B64F 5/60 |
| | | | 73/112.01 |
| 2014/0376593 A1* | 12/2014 | Ewing | G01K 1/20 |
| | | | 374/179 |
| 2017/0030779 A1* | 2/2017 | Rudkin | G01K 7/12 |

(Continued)

FOREIGN PATENT DOCUMENTS

| | | |
|---|---|---|
| EP | 2 402 728 A2 | 1/2012 |
| GB | 2510654 | 9/2016 |

(Continued)

OTHER PUBLICATIONS

Walsh et al., Effects of Sand Ingestion on the Blockage of Film-Cooling Holes, ASME Turbo Expo 2006: Power for Land, Sea and Air, May 2006, Barcelona, Spain (10 pages).

(Continued)

*Primary Examiner* — Eric S. McCall
(74) *Attorney, Agent, or Firm* — Brinks Gilson & Lione

(57) ABSTRACT

A gas turbine engine probe comprises a housing mounted in a borescope port of the engine. The housing includes at least one coolant passage that conducts coolant through the housing. The probe develops an indication of an engine condition, such as blockage in the engine due to sand and/or other debris.

20 Claims, 9 Drawing Sheets

(56) References Cited

U.S. PATENT DOCUMENTS

| | | | |
|---|---|---|---|
| 2018/0058233 A1* | 3/2018 | Norton | F01D 21/003 |
| 2018/0230913 A1 | 8/2018 | Clark et al. | |
| 2019/0208143 A1* | 7/2019 | Brooks | A61B 1/00147 |
| 2019/0277770 A1* | 9/2019 | Mekala | G01N 21/954 |
| 2019/0289227 A1* | 9/2019 | Hirosawa | A61B 5/0086 |
| 2019/0323430 A1* | 10/2019 | Schwarz | F01D 25/12 |
| 2020/0114497 A1* | 4/2020 | Graham | B25J 18/02 |
| 2020/0114528 A1* | 4/2020 | Graham | B25J 18/06 |
| 2020/0282574 A1* | 9/2020 | Norton | B25J 15/0019 |

FOREIGN PATENT DOCUMENTS

| | | | |
|---|---|---|---|
| WO | 2015023322 A2 | 2/2015 | |
| WO | WO 2015/034513 A1 | 3/2015 | |

OTHER PUBLICATIONS

Extended European Search Report for EP 20 15 7972.9, dated Jul. 21, 2020, 6 pp.

\* cited by examiner

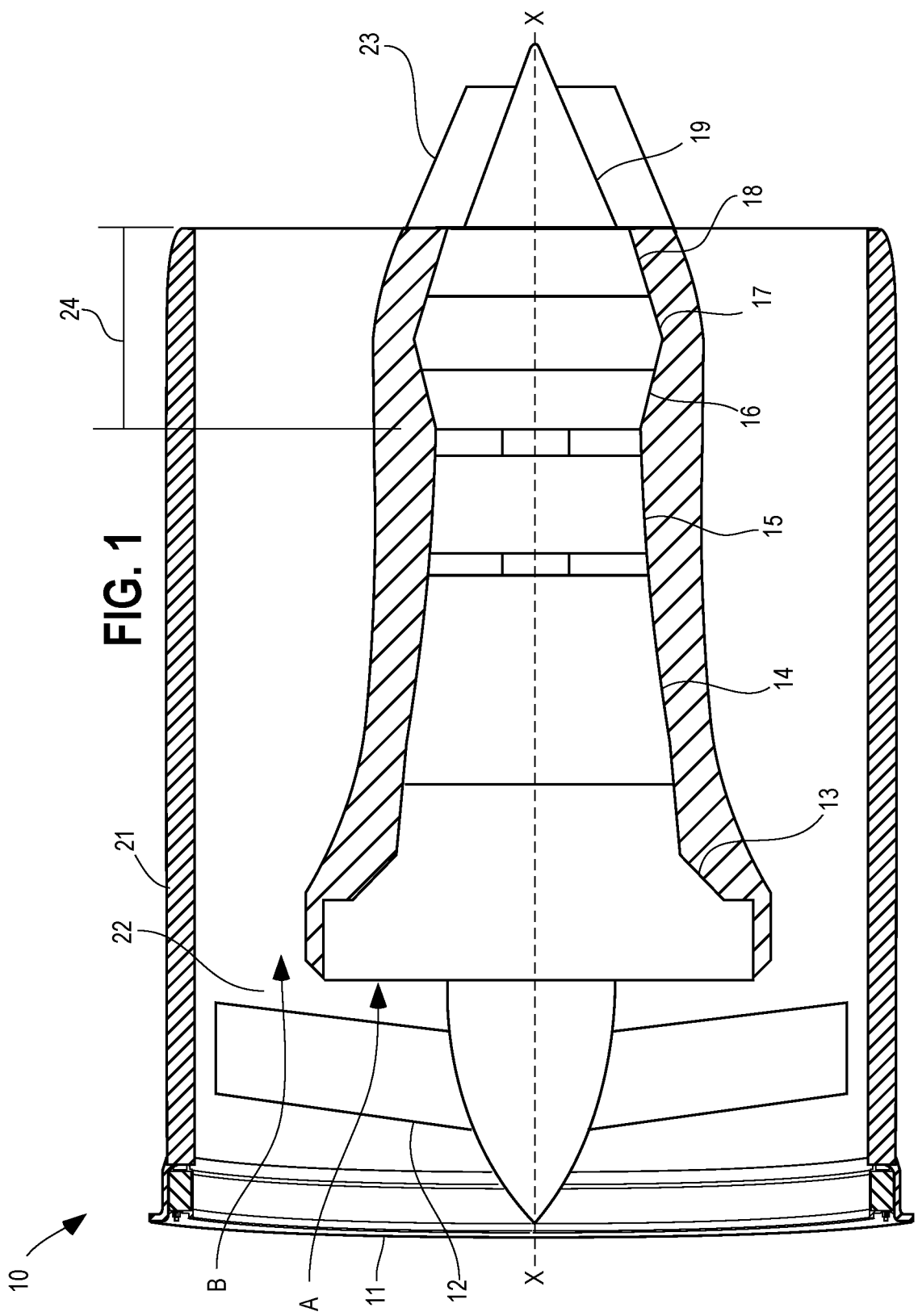

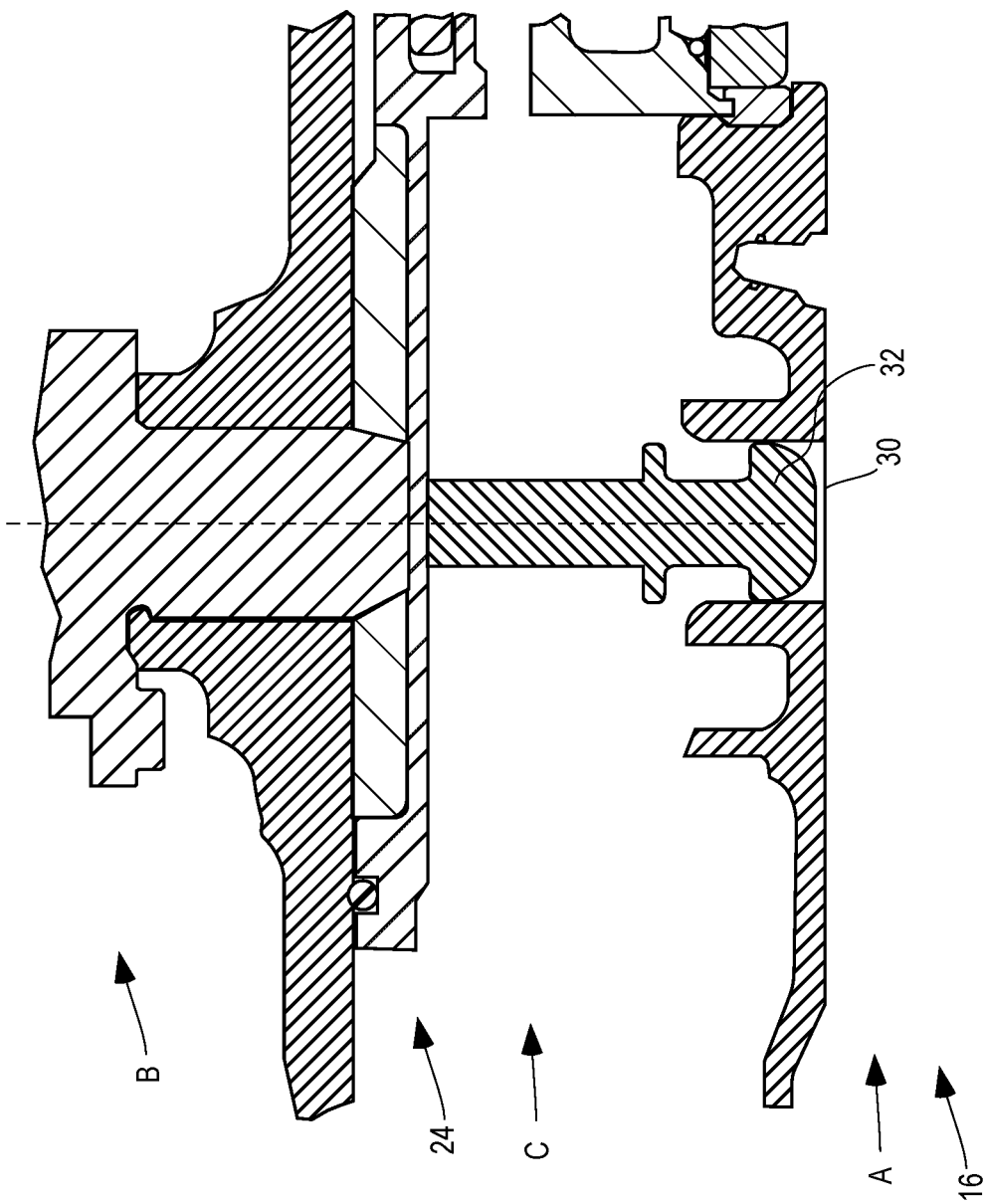

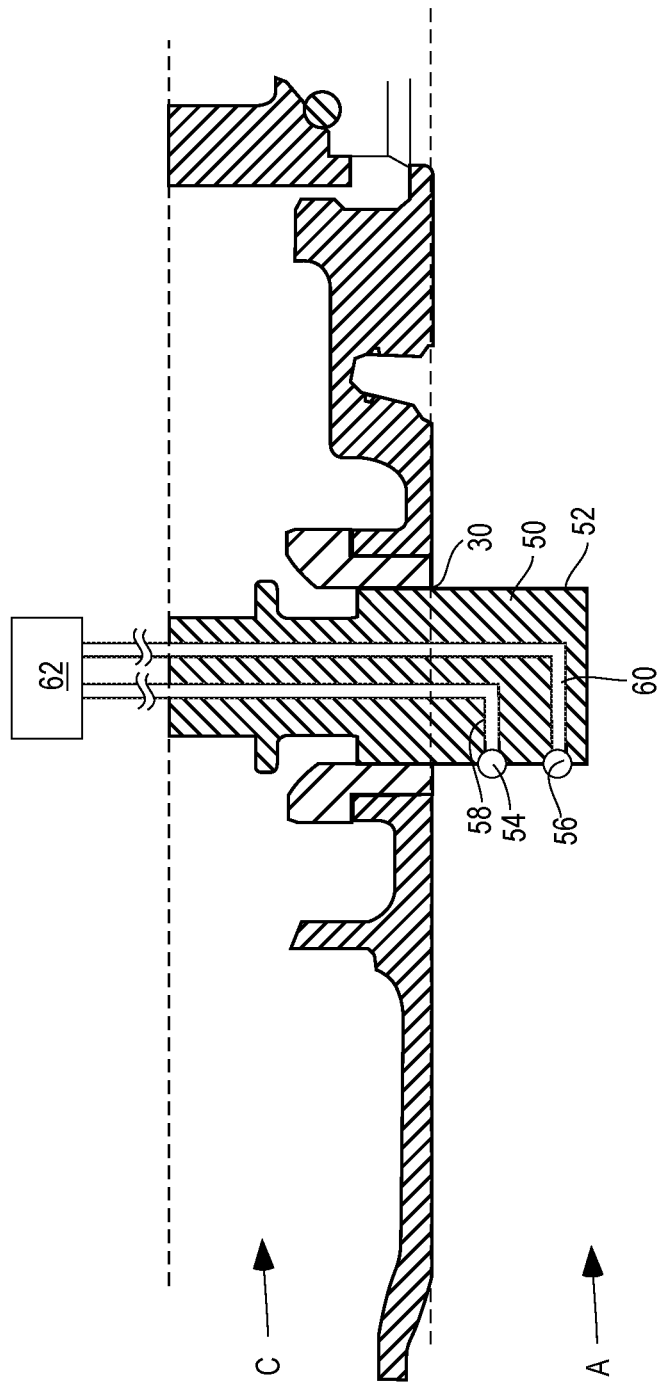

GAS TURBINE ENGINE PROBES AND METHODS OF DETECTING AN ENGINE CONDITION

FIELD OF DISCLOSURE

The present invention relates generally to gas turbine engines, and more particularly to probes and methods for detecting a condition of a gas turbine engine.

BACKGROUND

Gas turbine engines are often subjected to conditions where dirt and sand are ingested into the engine. This condition is particularly prevalent in both the main gas path and coolant streams of turbine engines used for aerospace propulsion. A typical filtration (if employed) comprises of inertial particle separators that involve turning the flow rapidly to centrifuge out the heavier particles. These systems are effective to remove larger particles when there is enough turning of the flow (at the cost of pressure and performance). Generally, the types of particles that find their way into cooling circuits as a result are small because they are immune to these filtration techniques. Such ingestion of these particulates chiefly occurs during takeoffs and landings, although particulate ingestion can occur during other phases of working operation.

Specifically, in a typical aircraft engine, cooling air is routed from the compressor section through combustor bypass passages to inside passages of vanes and blades for convective cooling. The cooling air is then directed through holes in the airfoil surfaces for film cooling. Particles entrained in the cooling air can impinge upon many surfaces and can break up into many small particles and block passages and film cooling holes. When internal cooling passages and film cooling holes are blocked in turbine components, the cooling necessary to maintain component temperatures at reasonable levels cannot be maintained and the particulates are exposed to extremely hot temperatures. This exposure can cause melting of sand particles and adherence of the particles to surfaces defining the coolant passages and/or coolant holes, thereby undesirably thermally insulating the associated part and reducing the overall supply of coolant flow. Furthermore, as the particle temperature rises, the accumulation rate accelerates. The result from this acceleration can range from the creation of a localized hot spot in a component, such as a blade, that can lead to a reduction in service life, particularly in the harsh turbine environment, to thermal runaway and failure of a component.

In the past, researchers have attempted to model engine components and operation in an effort to understand and compensate for the effects of particle transport and deposition. An alternative approach utilizes a dedicated engine operating off-line (i.e., operating in a non-working condition, for example, on a test stand or other rig) with probes and other specialized and complex sensors distributed at selected locations of the engine upstream and downstream of the turbine section. Readings of the sensors are collected and used to develop one or more engine models that can be used to refine the design and/or operation of the engine and to assist in predicting when one or more given operational condition(s) will arise, such as a turbine section blockage. Thus, for example, a model may be used to determine that an engine borescope inspection should take place every X hours of working or total operation, an engine tear down and visual inspection should occur every Y hours of operation, and a complete overhaul be undertaken every Z hours of operation. Ultimately, however, the physics of airflow with entrained particles through an engine and the resulting effects on gas turbine engine components is so complex that characteristic(s) of an engine operating in a working condition (i.e., mounted on and propelling an aircraft) and experiencing real-world environments can only be predicted approximately. In fact, an engine in a working condition may encounter a particular operational condition before the theoretical time predicted by a model or a dedicated off-line engine.

Pressure and temperature readings obtained from the turbine section itself can be used to obtain an indication of a turbine section blockage condition. However, the environment in the turbine is quite hostile with gas temperatures often exceeding common material limits. The turbine components are therefore designed with advanced cooling systems, coatings and materials to survive in the aggressive environment. These components are optimized to maximize performance and minimize life cycle cost. Instrumentation tends to harm both of these goals, i.e., instrumentation disrupts the aerothermal performance of the component and introduces a local vulnerability that can reduce the component life. As a consequence, instrumenting turbine components is typically limited to short duration demonstrators or is omitted altogether.

Some turbine components include a port for borescope access. During inspection the borescope camera is inserted through the casing, through the component borescope port and into the flow path. When not in use, the borescope port is sealed with a metallic plug. The metallic plug is designed such that it seals during engine operation and can be replaced (if needed) during standard maintenance. The borescope port and plugs are about 1 cm in diameter to allow the camera to be inserted and manipulated.

U. S. Published Patent Application No. 2018/0230913 discloses a pressure sensor that is mounted within a component. This sensor does not measure the total conditions and is protected from the turbine environment i.e., the sensor is shielded from high gas temperatures and sand.

SUMMARY

In accordance with one aspect, a probe includes a housing secured in a borescope plug of a gas turbine engine wherein the housing includes at least one passage that conducts coolant through the housing and at least one sensor carried by the housing in a turbine gas flow of a turbine section of the gas turbine engine during working operation thereof. The at least one sensor is further in fluid communication with the coolant and develops an output signal representing a condition of the turbine section. A circuit is coupled to the at least one sensor for developing an indication of engine blockage from the output signal.

In accordance with a further aspect, a method of detecting a blockage condition in a turbine section of a gas turbine engine having a borescope port adjacent the turbine section includes the steps of providing a housing having at least one passage and mounting the housing in the borescope port such that the passage is in fluid communication with an engine coolant flow path and an engine main flow path. The method further includes the steps of operating the gas turbine engine in a working operational mode and detecting a condition of the housing to obtain an indication of engine blockage.

In accordance with a still further aspect, a probe comprises a housing adapted to be secured in a borescope plug of a gas turbine engine wherein the housing includes an inner passage that is adapted to conduct coolant through the housing, an inner tube surrounding the inner passage, and an outer passage surrounding the inner tube. An outer housing portion surrounds the outer passage and a plurality of holes extends through the inner tube from the inner passage to the outer passage. At least one outlet port extends outwardly from the outer passage and is adapted to conduct coolant into an engine main flow path.

BRIEF DESCRIPTION OF THE DRAWINGS

FIG. 1 comprises a generalized diagram of a gas turbine engine;

FIG. 2 comprises a fragmentary sectional view of a portion of the gas turbine engine of FIG. 1;

FIG. 4 is a generalized sectional view of an embodiment of a probe that may be used with a gas turbine engine, for example, the engine of FIG. 1;

DETAILED DESCRIPTION

Figure 3A:
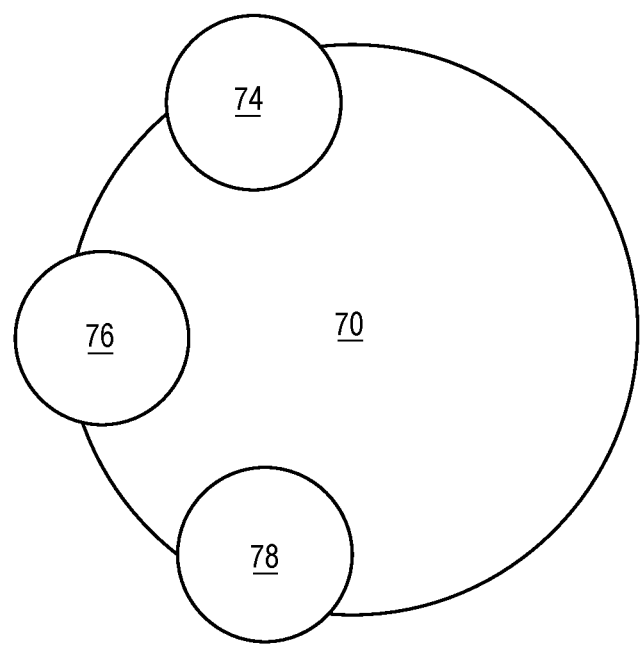
FIGS. 3A and 3B are radial elevational generalized views illustrating shapes of two embodiments of probes that may be used with a gas turbine engine, such as the engine of FIG. 1.

With reference to FIG. 1, a gas turbine engine 10 is illustrated, which is particularly adapted for use as an aircraft jet engine. If desired, the gas turbine engine may instead provide motive power to one or more other loads, such as a generator as part of a genset. The engine 10 has a longitudinal rotational axis X-X and comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22, and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and combusted. The resultant hot combustion products then expand and drive the high, intermediate, and low-pressure turbines 16, 17, 18 before being exhausted through the nozzle 19 to develop additional thrust. The high, intermediate, and low-pressure turbines 16-18 drive the high and intermediate pressure compressors 14, 13 and the fan 12 via one or more shafts. While FIG. 1 illustrates a particular embodiment of a gas turbine engine, other embodiments (not shown) may have different component configurations including more or fewer components, such as engines that do not include intermediate compressors or turbines.

Referring also to FIG. 2, a portion of the second airflow B is diverted through passages (not shown) and is provided as a coolant air flow C to the turbine section 24 comprising the high-pressure turbine 16, the intermediate pressure turbine 17, and the low-pressure turbine 18.

During working operation on-wing, the engine 10 may ingest sand and/or other particulate contaminants, particularly during takeoffs and landings. In such a case the particulates become entrained in the air flows A, B, and/or C and can undesirably affect the components in the engine 10 as noted previously. A borescope port 30 is sometimes provided adjacent the high-pressure turbine 16 and the port 30 is typically sealed during engine operation by a borescope plug 32, which is positioned in the surfaces defining the port 30. Typically, inspection of the turbine 16 is undertaken by removing the borescope plug 32 and inserting a borescope camera (not shown) through the port 30 while the engine is off. Thereafter, the plug 32 is reinserted into the port 30 before the engine 10 is started.

According to one aspect and as discussed specifically hereinafter, the plug 32 is replaced by a probe that removably seals the borescope port 30 and allows for the addition of instruments. The instrumentation could include thermocouples, pressure taps, sand and dust blockage sensors, deflection gauges, and/or any other type of sensor that could fit within the dimensions of the probe. The instruments are located in the coolant flow path and benefit therefrom in the sense that service life is improved even while readings related to the turbine section can be obtained. Leads to these instruments are fed back through the probe housing to a data acquisition system. In a specific embodiment, the probe is designed to extend sufficiently into the flow path in the turbine section to obtain stagnation temperature and pressure readings in addition to static pressure measurements. In addition, since the probe can be removed from the engine, the probe can be tested in the laboratory to gauge the remaining life thereof, thus providing quantitative information in addition to allowing visual inspection using the borescope camera. Furthermore, one or more probes can be swapped in or out of the port 30, and this ability provides the opportunity to quickly test different instrumentation configurations for engine diagnostics without the cost of stripping the engine. This is particularly useful for severe turbine environments since the probe (and instrumentation) can be replaced before risking exposing the engine to a DOD (domestic object damage) event.

The present embodiments can be used on any engine portion, such as a turbine section, with a borescope port/plug. Depending on the application, the probe can be made long and slender to minimize the flow field disturbance (see FIG. 3B) or the probe can be kept short and rigid for increased strength in high temperature/pressure environments (see FIG. 3A). Extending the probe into the flow provides additional measurement accuracy by spacing measurements away from one or more surfaces that could introduce errors in the readings.

Figure 3B:
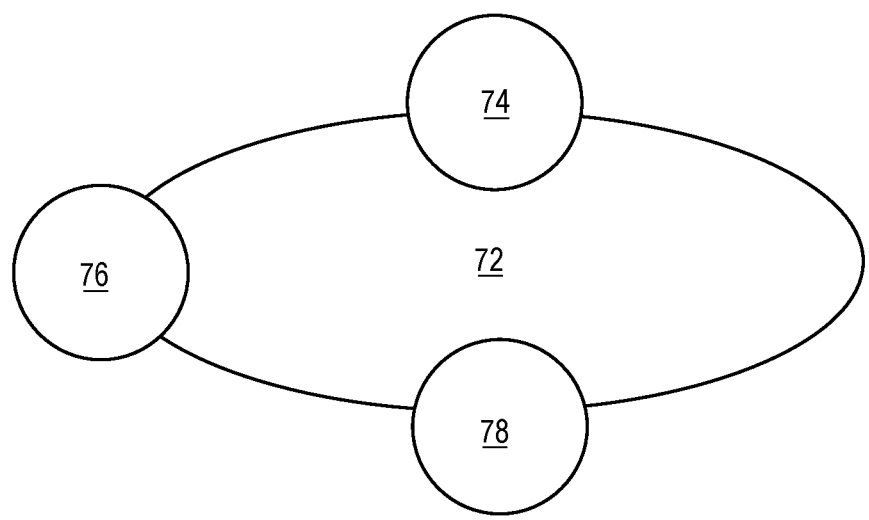

Referring next to FIG. 4, a generalized embodiment comprises a probe 50 having a housing 52 and first and second instruments or sensors 54, 56. First and second sensor leads 58, 60 extend between the first and second sensors 54, 56, respectively, and a data acquisition unit or circuit 62. The probe 50 is positioned into and secured in any suitable manner in the borescope port 30, for example, in a manner similar to the way in which the plug 32 is secured in the port 30 as illustrated in FIG. 2. When viewed in the radial dimension, the probe may have a circular shape (FIG. 3A) or an elongate shape, such as an elliptical shape (FIG. 3B). FIGS. 3A and 3B otherwise show probes 70, 72 each having three instruments or sensors 74, 76, and 78 rather than two sensors, it being understood that any number of instruments or sensors may be included in a probe, depending upon space constraints. While not illustrated in FIGS. 3A, 3B, and 4, the probes shown therein are located in or adjacent to the coolant flow path C, similar or identical to the remaining disclosed embodiments below.

Figure 5:
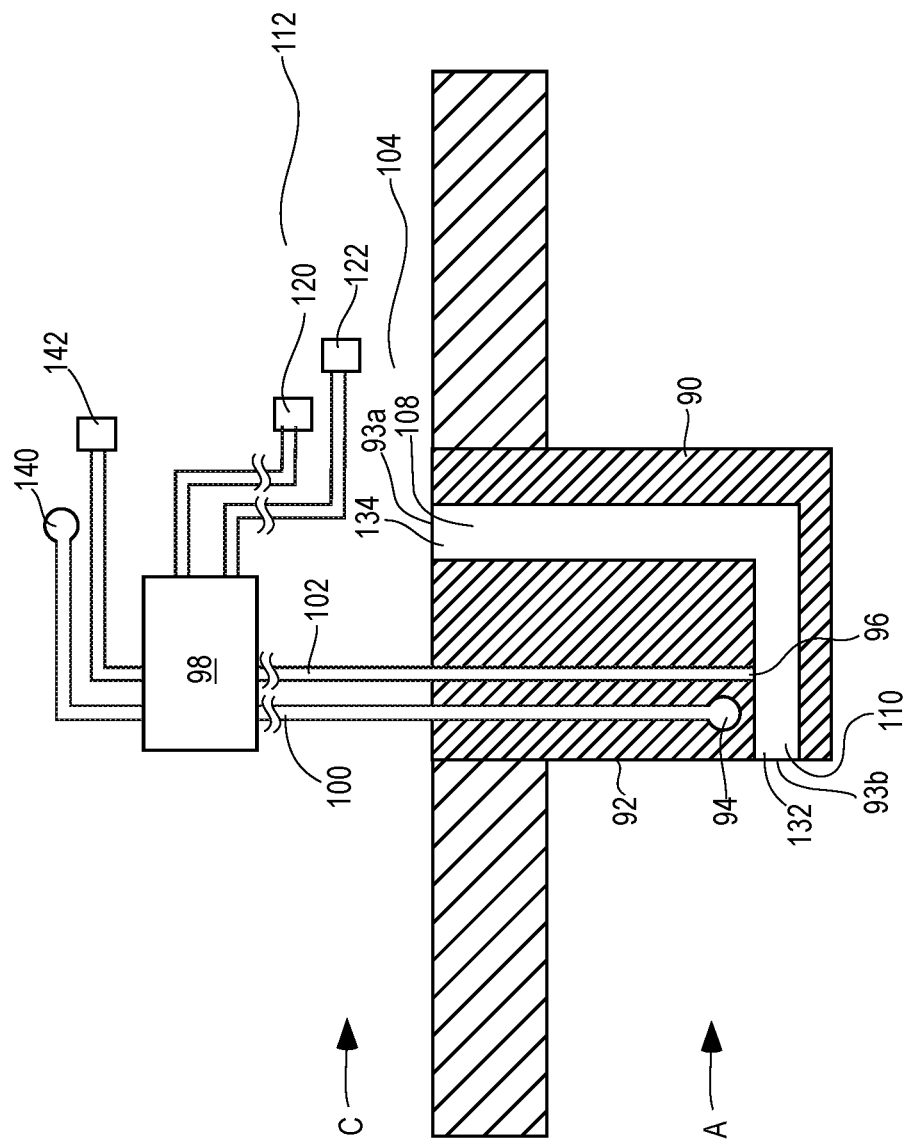
FIGS. 5 and 6 are sectional views similar to FIG. 4 of further embodiments of a probe that may be used with a gas turbine engine, for example, the engine of FIG. 1.

The specific embodiment of FIG. 5 comprises a probe 90 including a housing 92, a first sensor 94, a second sensor 96, and a data acquisition unit or circuit 98 coupled to output leads 100, 102 of the first and second sensors 94, 96, respectively, In the illustrated embodiment, the first sensor 94 comprises a temperature sensor, such as a thermocouple, thermistor, or similar device capable of withstanding high temperatures and preferably a low cost device, while the second sensor 96 comprises a pressure tap or other suitable device, preferably a low-cost device capable of withstanding the adverse turbine environment. The housing 92 may accommodate a greater or lesser number of sensors than those illustrated, as noted previously.

The housing 92 further includes one or more passages that fluidically interconnect a sensor inlet 93a coupled to a coolant source 104 and a sensor outlet 93b coupled to the main flow path A. In the illustrated embodiment, first and second interconnected passages 108, 110 that are preferably transverse to one another, and, more preferably, perpendicular to one another, are disposed in the housing 92 and extend between the source 104 and the flow path A. The coolant source 104 preferably comprises a plenum 112 that receives the air flow C described previously. The housing 92 is preferably made of a thermally conductive, high temperature resistant material, such as a suitable metal including titanium, steel, aluminum, or an alloy or other combination of one or more of such materials with one or more other material(s) that can resist the harsh environment of the high-pressure turbine and permit the housing 92 to be secured in a suitable manner, such as described above, within the borescope port 30. The first sensor 94 is embedded in the housing 92 and develops a signal $T_{metal}$ representing the temperature thereof at a location within the high-pressure turbine. The second sensor 96 is embedded in the housing 92 and is exposed to (i.e., is in fluid communication with) the flow of coolant in the passage 110 and develops a signal $P_{S(passage)}$ representing the static pressure of the coolant in the passage 110. The signals $T_{metal}$ and $P_{S(passage)}$ are provided to the data acquisition unit 98. The leads that conduct the signals developed by the first and second sensors 94, 96 are constructed of materials that can withstand the environment of the housing 92, as should be evident.

The data acquisition unit 98 further receives signals $T_{coolant}$ and $P_{T(coolant)}$ developed by additional third and fourth sensors 120, 122, respectively, wherein $T_{coolant}$ and $P_{T(coolant)}$ represent the temperature and total pressure, respectively, of the coolant in the plenum 112. The sensors 120 and 122 may be any suitable temperature and pressure sensing devices, such as those previously described.

If desired, in any of the embodiments disclosed herein the data acquisition unit 98 (and/or the unit 208 hereinafter) may further receive one or more additional signals generated by sensor(s) located in the probe or another portion of the engine representing an engine operational parameter, such as the total, static, or dynamic pressure in the main flow path A of the engine. The additional signal(s) may be used to develop an alternative and/or enhanced indication of engine blockage.

Further in the illustrated embodiment, the data acquisition unit 98 preferably comprises a programmable processing device, such as a microprocessor or an application specific integrated circuit (ASIC) or the like that develops an indication of blockage in the engine 10. The data acquisition unit 98 may execute the programming illustrated in FIG. 9 to determine whether an engine condition has arisen.

The programming utilizes known relationships between engine parameters to obtain an indication of engine blockage. For example, from Bernoulli's equation, simplified to ignore changes in elevation:

$$P_{T(passage)} \approx P_{S(passage)} + 0.5\rho V^2$$

Also, in the illustrated condition, assuming no blockage in the passages 108, 110:

$$P_{S(passage)} < P_{gas} < P_{T(coolant)}$$

From these conditions, one can determine that:

$$\text{Flow} = f((P_{T(coolant)} - P_{S(passage)}), \text{Area}, T)$$

Figure 9:
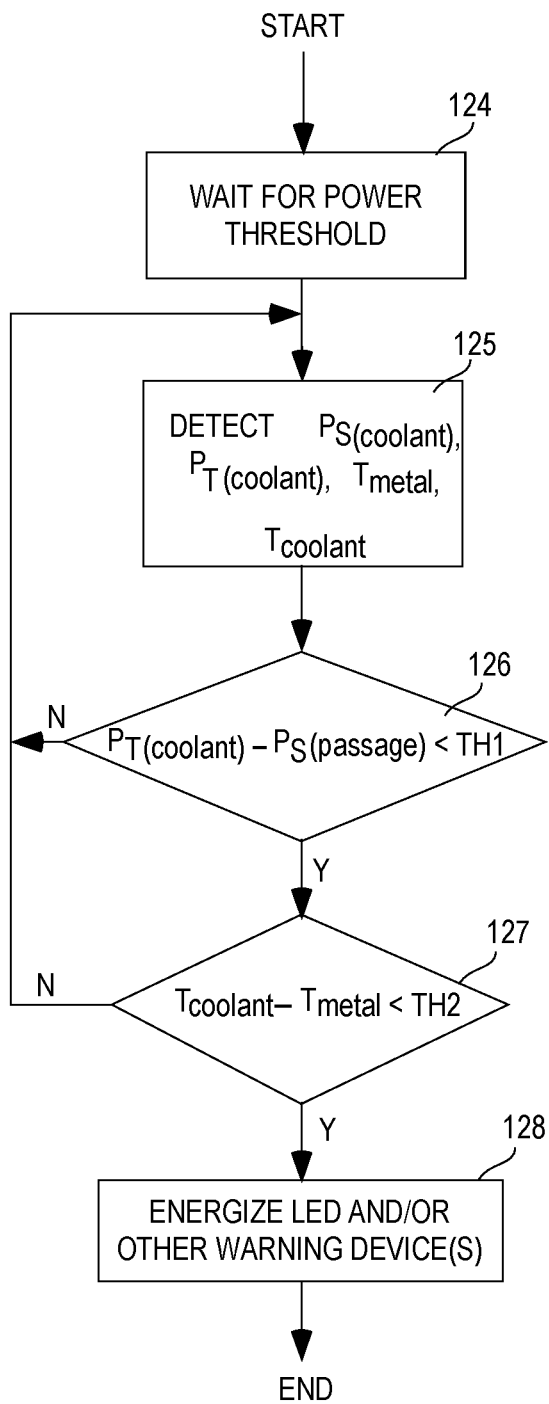
FIG. 9 is a flowchart of programming that may be executed by the data acquisition unit of the embodiments of FIGS. 4-6.

The programming illustrated in FIG. 9 begins at a block 124, which pauses execution until a particular engine power setting is reached. Thereafter, a binary indication of engine blockage can be obtained by checking the signals representing the foregoing parameters (block 125). Specifically, if the data acquisition unit 98 detects that $P_{T(coolant)} - P_{S(passage)}$ has dropped below a threshold level TH1, and that $T_{coolant} - T_{metal}$ has dropped below a second threshold TH2 (blcoks 126, 127) then one can infer that flow has dropped to zero due to an end 132 being blocked by sand and/or other debris. In such an event the data acquisition unit 98 may develop a signal (block 128) to energize a warning device, such as an LED 140, an audible alarm, or the like. Such a warning could signal that sand and/or other particulates are present in the main flow path A in such concentrations to warrant, for example, a complete tear down and inspection of the engine 10. Alternatively, the data acquisition unit 98 may check other conditions to determine whether other blockage conditions have arisen. Thus, fssor example, if the unit 98 (or 208 described hereinafter) determines that $P_{S(coolant)} \approx P_{gas}$ and $T_{metal} >> T_{coolant}$, where $P_{gas}$ is the static pressure in the main flow path A, then it could be inferred that the inlet of the passage 108 at an end 134 is blocked by sand and/or other debris. In such case the data acquisition unit 98 may develop a signal to energize either the LED 140 or a different LED 142. Such a warning could signal that that sand and/or other particulates are present in the flow path C to warrant, for example, a visual inspection of the components guiding the flow path C.

Detection of blockage in other parts of the engine may require changes in the size/shape of the passage 108.

Alternatively or in addition, if desired, in any of the embodiments disclosed herein, a continuously varying indication of the flow rate through the passages 108 and 110 may be evaluated to develop the or another indication of blockage in the engine. The outputs of the sensors 94, 96, and 122, and/or other sensors may be evaluated by the data acquisition unit 98 using known equations and relationships.

Figure 6:
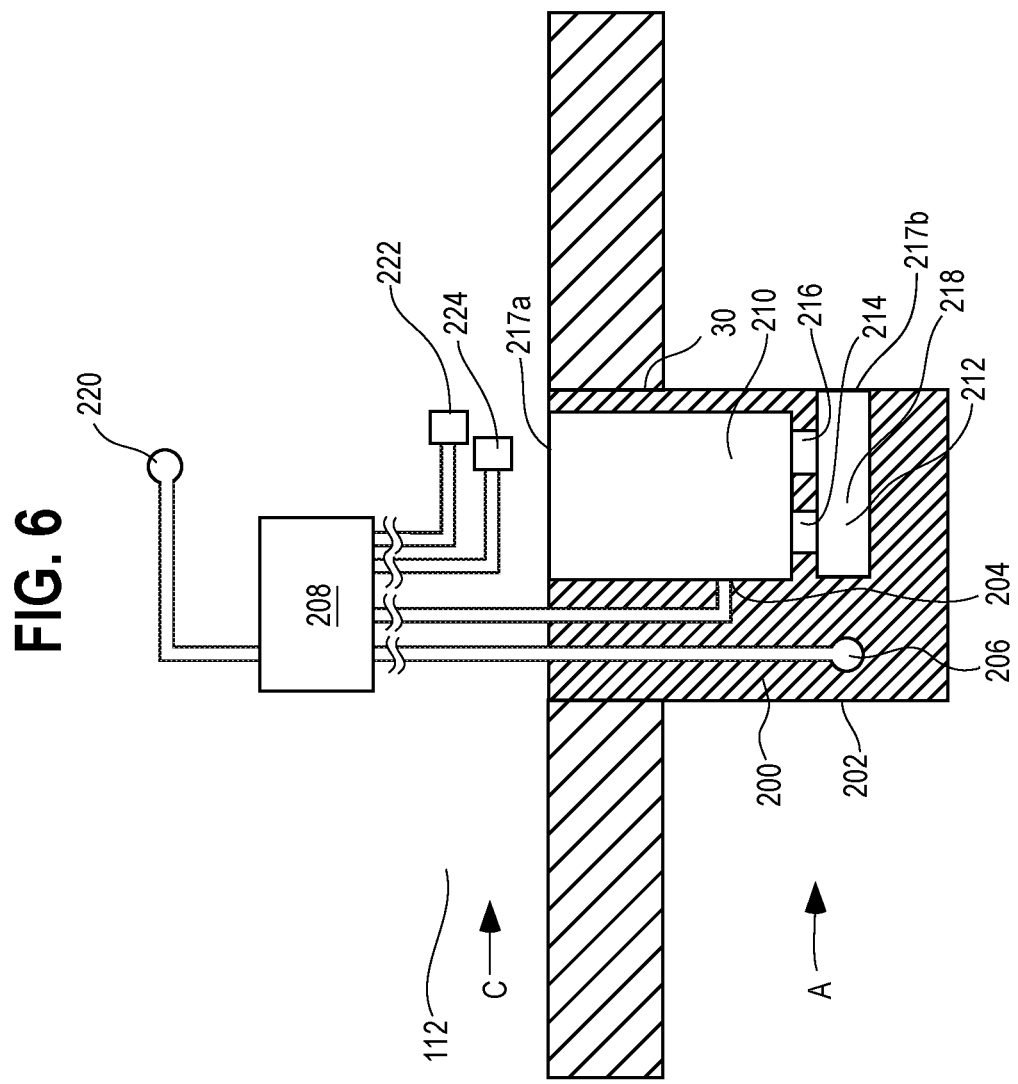

FIG. 6 illustrates a further embodiment of a blockage probe 200 having a housing 202, and first and second sensors 204, 206, that develop signals representing $P_{S(coolant)}$ and $T_{metal}$, respectively, together with a data acquisition unit 208, all of which may be similar or identical to the housing 92, the first and second sensors 94, 96 and the data acquisition unit 98 of the previous embodiment, respectively, with the exceptions noted hereinafter. The housing 202 is secured in the borescope port 30 as in the previous embodiment and includes a first passage 210, a second passage 212 and at least one, and preferably, first and second impingement holes 214, 216. The first passage 210 has an inlet 217a in fluid communication with the coolant air flow C in the plenum 112 and the second passage 212 has a sensor outlet 217b in fluid communication with main airflow A. Unlike the previous embodiment, the second passage 212 is oriented away from the airflow A, i.e., an opening 218 of the passage 212 is disposed downstream of the remainder of the passage 212 so that the air flow A has little, if any, effect on sand deposition. The impingement holes 214, 216 normally provide fluid communication between the passages 210 and 212.

The impingement holes 214, 216 are preferably of equal cross sectional sizes and such sizes are preferably substantially smaller than cross sectional sizes of the passages 210 and 212. Alternatively, the impingement holes 214, 216 may be of different sizes and/or may be disposed at different locations. In any event, the location/quantity/orientation of the holes are selected such that the probe 200 demonstrates a blockage behavior similar to a turbine stage or one or more selected components thereof. In one embodiment, the size(s) of the impingement holes are selected to be equal or substantially equal to size(s) of passage(s) that fluidically interconnect the bypass air flow B and the coolant air flow C. (The first, second and third orifices are not shown, but are ports or passages that bleed off cooling air from the air flow B to develop, at least in part, the airflow C). In use, sand and/or other particulates may build up below and/or within the impingement holes, thus restricting coolant air flow through the housing 202. As in the previous embodiment, a binary indication of engine blockage may be obtained by the data acquisition unit 208, which may develop a signal to energize an LED 220 and/or another alarm when the output signals of the sensors 204, 206, as well as sensors 222, 224 similar or identical to the sensors 120, 122 of the previous embodiment, indicate that $P_{T(coolant)} - P_{S(passage)} <$ TH1 and $T_{coolant} - T_{metal} <$ TH2. The unit 208 may execute the above-described programming of FIG. 9 to effectuate this result. The correlation of the size(s) of the impingement holes 214, 216 with passages that fluidically interconnect the air flows B and C causes the detection of blockage to be an indicator of overall or partial engine blockage. Suitable corrective action may be taken in response to such detection.

Figure 7:
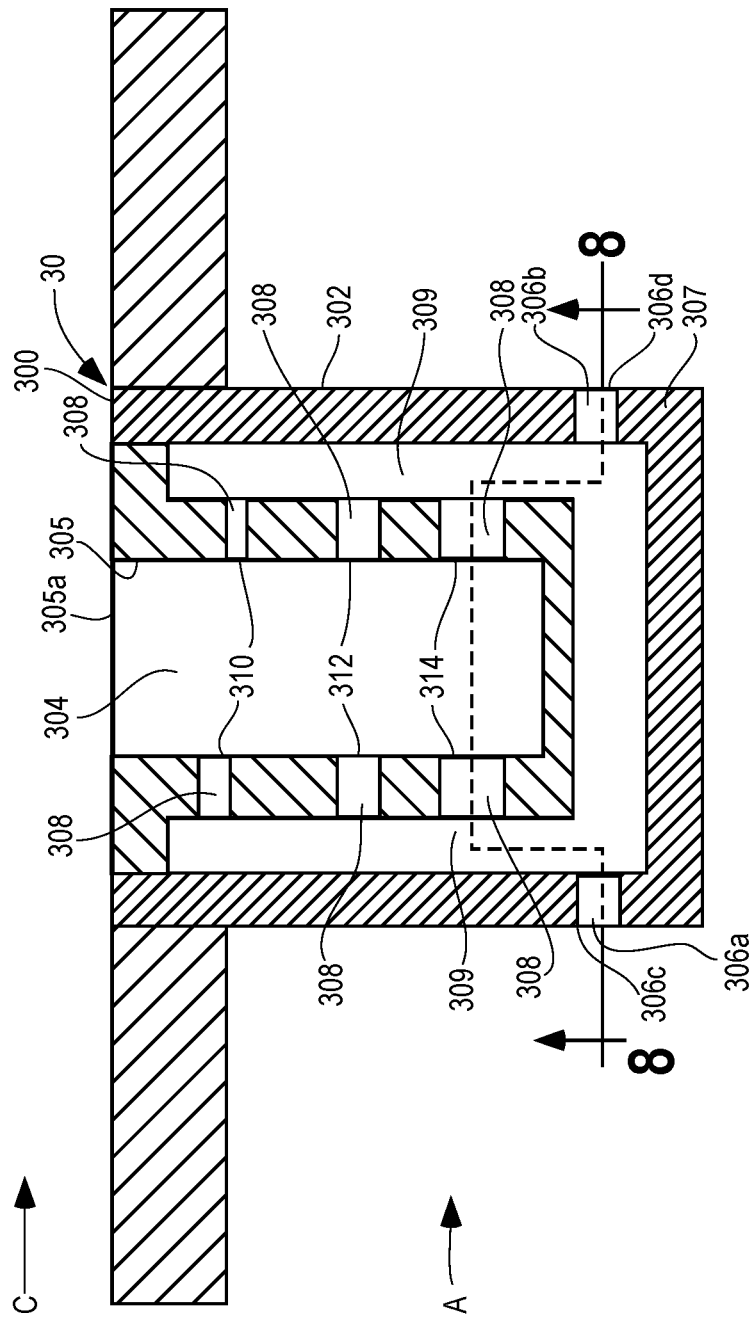
FIG. 7 is a sectional view similar to FIG. 4 illustrating yet another probe embodiment.
Figure 8:
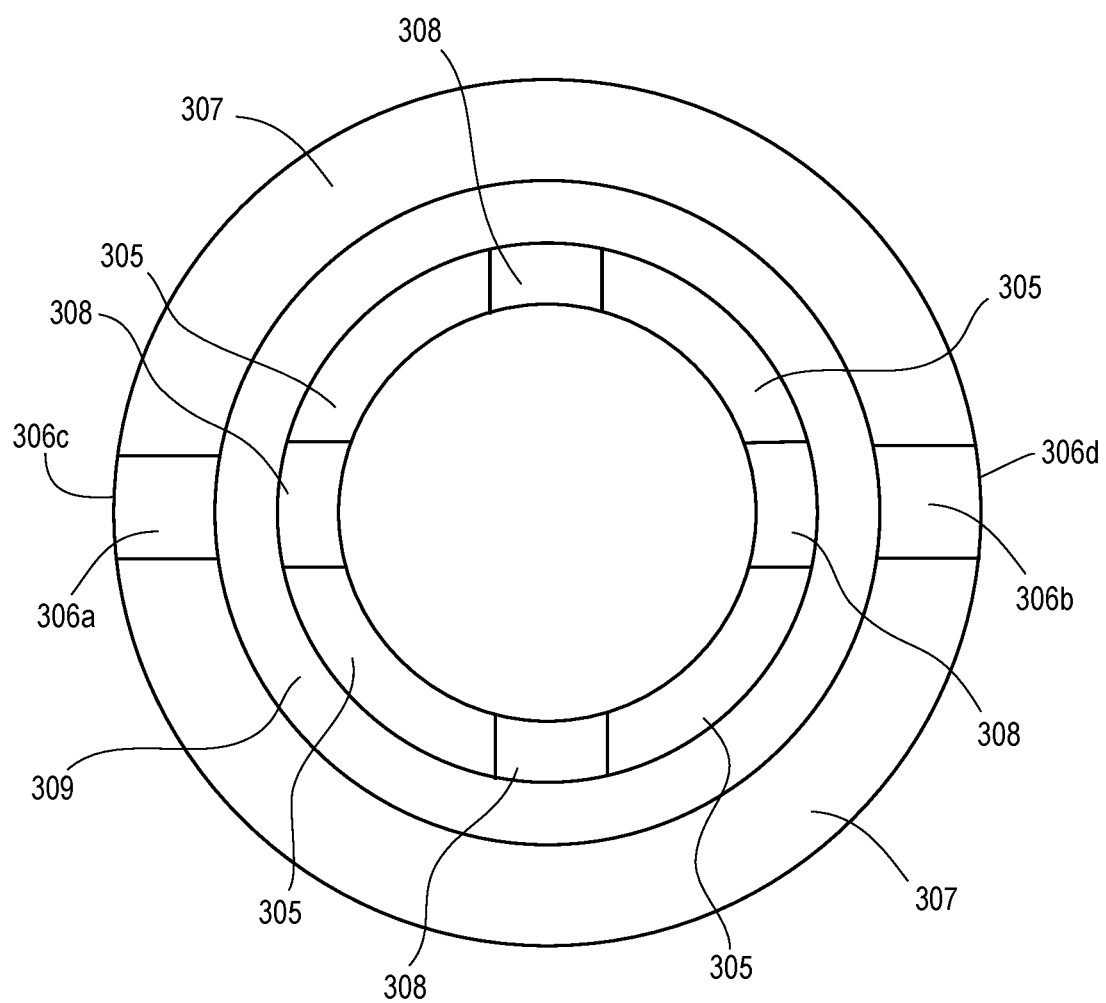
FIG. 8 is a sectional view taken generally along the lines 8-8 of FIG. 7.

FIGS. 7 and 8 illustrate yet another probe embodiment 300 that may be mounted in the borescope port 30 as in the previous embodiments. The probe 300 does not utilize any sensors or communicate with a data acquisition unit, and may thus be considered a passive sensor. After a period of engine usage, preferably, in a working operational condition on-wing, the probe 300 may be removed from the port 30 and inspected visually and/or using instrumentation, such as material testing device(s), flow checking device(s), and/or thermal imaging using an infrared camera to obtain an indication of engine blockage. The probe 300 includes a metal housing 302 with material(s) similar to the previous embodiments, but which otherwise replicates the cooling architecture of the engine 10 including effusion, a dual-wall design comprising concentric cylinders, etc.

Specifically, the housing 302 includes a first passage 304 extending axially in a cylindrical inner tube 305 from an inlet 305a, two or more second passages illustrated in FIGS. 7 and 8 as radial passages 306a, 306b extending through an outer member to outlets 306c, 306d, wherein the outer member may comprise an outer tube 307 that is preferably concentric with the inner tube 305, and a plurality of impingement holes 308 extending radially outward from the first passage 304 at spaced locations about the inner tube 305 to a second cylindrical passage 309. The inner tube 305 is joined to the outer tube 307 in any suitable fashion so that the housing 302 comprises a unitary apparatus that is sealed except at the inlet 305a and the outlets 306c, 306d. In the illustrated embodiment, three sets of four impingement holes 308 are spaced about the inner tube 305. The holes 308 of a first upper-most set 310 are of a first size, whereas the holes 308 of a second medial set 312 are of a second size larger than the first size, and the holes 308 of a third lowest-most set 314 are of a third size larger than the first and second sizes. Also in the illustrated embodiment, the first, second, and third sizes are unequal such that the first size is equal to the size of one or more first orifice(s) between the bypass duct 22 and the plenum 112, the second size is equal to the size of one or more second orifice(s) between the bypass duct 22 and the plenum 112, and the third size is equal to the size of one or more third orifice(s) between the bypass duct 22 and the plenum 112. (As in the previous illustrated embodiment, the first, second and third orifices are not shown, but are ports or passages that bleed off cooling air from the air flow B to develop, at least in part, the airflow C). If desired, any or all of the sizes of any or all holes of the sets may not necessarily be aligned and may be different and/or a different number of sets of holes may be provided and/or a different number of holes may be provided in any or all sets. Furthermore, the radial position, quantity, and orientation of the holes may be selected such that the probe demonstrates similar blockage behavior to the turbine stage on one or more components thereof.

The correspondence of the first, second and third sizes with the sizes of the first, second, and third orifices models the cooling system such that clogging of one or more of the impingement holes 308 can serve as a predictor of a clogging condition in one or more parts of the cooling system. Specifically, if the probe 300 is removed from the engine 10 after a first particular period of engine operation and inspected, and such inspection reveals that one or more of the impingement holes 308 of the first set 310 is substantially or fully clogged, and that no holes 308 of the second and third sets 312, 314 is clogged, then an inference can be drawn that sand and/or other particulates have clogged at least some of the smaller orifices of the cooling system, and either no corrective action or a first corrective action should be undertaken. On the other hand, an inspection of the probe 300 at a time after the first particular period may reveal that holes 308 in one or both of the second and third sets 312, 314 have been clogged, indicating that further, possibly more aggressive corrective action should be undertaken. Thus, for example, if one or more of the holes 308 of the second set 312 are clogged, but not any of the holes 308 of the third set 314 are clogged, then a second corrective action more aggressive then the first corrective action might be undertaken. Clogging of at least some of the holes 308 of the third set 314 may result in a third corrective action more aggressive than the first and second action being undertaken.

If desired, the diameters of the impingement holes 308 may be reduced to obtain an earlier indication of component blockage. Further, the holes 308 may be spaced in a different manner about the inner tube 305 than as illustrated.

INDUSTRIAL APPLICABILITY

The embodiments disclosed herein are particularly suited for (but not limited to) early detection of blockage in the high-pressure turbine 16 while the engine 10 is operating in the working condition. The probes disclosed herein are located in the coolant flow path as well as the main flow path to obtain accurate turbine section readings while minimizing disruption of the main flow and obtaining adequate service life.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:

1. A probe, comprising:
   a housing secured in a borescope plug of a gas turbine engine wherein the housing comprises at least one passage that conducts coolant through the housing;
   at least one sensor carried by the housing in a turbine gas flow of a turbine section of the gas turbine engine during working operation thereof, wherein the at least one sensor is further in fluid communication with the coolant and develops an output signal representing a condition of the turbine section;
   a circuit coupled to the at least one sensor for developing an indication of engine blockage from the output signal.

2. The probe of claim 1, wherein the housing has a circular cross section when viewed in a radial direction of the engine.

3. The probe of claim 1, wherein the housing has an elliptical cross section when viewed in a radial direction of the engine.

4. The probe of claim 1, wherein the at least one passage comprises first and second transverse passages wherein the first transverse passage extends between an inlet and the second transverse passage, and wherein the second transverse passage extends between the first transverse passage and an outlet.

5. The probe of claim 4, further comprising at least one impingement hole that provides fluid communication between the first transverse passage and the second transverse passage, and wherein the at least one sensor comprises a pressure sensor in fluid communication with the first passage that develops a signal representing a static pressure of coolant in the first transverse passage and a temperature sensor disposed in the housing that develops a signal representing housing temperature.

6. The probe of claim 1, wherein the at least one sensor comprises first and second sensors that develop first and second sensor output signals representing first and second engine conditions, respectively.

7. The probe of claim 6, wherein the first sensor comprises a pressure tap disposed adjacent to the at least one passage.

8. The probe of claim 6, wherein the second sensor comprises a temperature sensor and wherein the second sensor output signal represents housing temperature.

9. The probe of claim 6, wherein the at least one passage comprises first and second transverse passages, wherein the at least one sensor comprises a pressure sensor in fluid communication with the second transverse passage that develops a signal representing a static pressure of coolant in the second transverse passage and a temperature sensor disposed in the housing that develops a signal representing housing temperature.

10. A method of detecting a blockage condition in a turbine section of a gas turbine engine comprising port adjacent the turbine section, the method comprising the steps of:
    providing a housing comprising at least one passage;
    mounting the housing in the borescope port such that the passage is in fluid communication with an engine coolant flow path and an engine main flow path;
    operating the gas turbine engine in a working operational mode; and
    detecting a condition of the housing to obtain an indication of engine blockage.

11. The method of claim 10, wherein the step of providing a housing comprises the step of providing at least one sensor in the housing that develops a signal representing a condition of the housing.

12. The method of claim 11, wherein the step of providing comprises the steps of providing a pressure tap disposed adjacent to the at least one passage wherein the pressure tap develops a first signal representing pressure in the at least one passage, providing a temperature sensor that develops a second signal representing housing temperature, and providing a data acquisition unit that receives the first signal and the second signal.

13. The method of claim 12, wherein the pressure tap comprises a first pressure sensor and the temperature sensor comprises a first temperature sensor and further comprising the step of providing a second temperature sensor and a second pressure sensor that develop third, and fourth signals, respectively, representing temperature and in the engine coolant flow path and supplying the third, and fourth signals to the data acquisition unit.

14. The method of claim 10, wherein the step of detecting comprises the step of at least one of visually inspecting the housing and using an instrument to inspect the housing.

15. The method of claim 14, wherein the step of providing comprises the step of providing a plurality of holes of different sizes and wherein the step of detecting comprises the step of determining whether any of the plurality of holes is clogged.

16. A probe, comprising:
    a housing adapted to be secured in a borescope plug of a gas turbine engine wherein the housing comprises an inner passage that is adapted to conduct coolant through the housing;
    an inner tube surrounding the inner passage;
    an outer passage surrounding the inner tube;
    an outer housing portion surrounding the outer passage;
    a plurality of holes extending through the inner tube from the inner passage to the outer passage;

at least one outlet port extending outwardly from the outer passage and adapted to conduct coolant into an engine main flow path;

at least one sensor carried by the housing and in fluid communication with the coolant, wherein the at least one sensor is adapted to develop an output signal representing a condition of the turbine section; and a circuit coupled to the at least one sensor, the circuit adapted to develop an indication of engine blockage from the output signal.

17. The probe of claim 16, wherein the plurality of holes comprise three sets of impingement holes.

18. The probe of claim 17, wherein the impingement holes of each set of impingement holes are of the same size.

19. The probe of claim 16, wherein the at least one outlet port comprises first and second outlet ports.

20. The probe of claim 19, wherein the inner tube and the outer housing portion are cylindrical and concentric with one another.

* * * * *